(No Model.)

C. LIGHTBODY.
WASTE OR SEWER TRAP.

No. 266,485. Patented Oct. 24, 1882.

Witnesses:
M. J. Leonard
E. O. Chapman

Inventor:
Colin Lightbody
By Chas. M. Higgins
Attorney.
New York

UNITED STATES PATENT OFFICE.

COLIN LIGHTBODY, OF BROOKLYN, NEW YORK.

WASTE OR SEWER TRAP.

SPECIFICATION forming part of Letters Patent No. 266,485, dated October 24, 1882.

Application filed February 25, 1882. (No model.)

*To all whom it may concern:*

Be it known that I, COLIN LIGHTBODY, of Brooklyn, in the county of Kings and State of New York, have invented certain new and useful Improvements in Waste or Sewer Traps, of which the following is a specification.

My improvement relates to that class of sewer-traps which are provided with a water-tank connected with the sealing-bend of the trap, the tank being supplied with a water-supply pipe discharging therein under the control of a flat valve inclosed by the tank, so that the water will always stand at the same level in tank and trap, and the water seal in the trap will be constantly renewed or maintained from the tank by the action of the float-valve, thus obviating the exhaustion of the seal by effects of evaporation or siphoning, and thereby effectually preventing the inflow of sewer-gases.

My present invention is an improvement more particularly upon the device of this class shown in a former patent issued to me May 10, 1881, No. 241,146. In that case, however, the tank formed a permanent part of the trap itself, and was attached directly to the side thereof, whereas my present invention consists mainly in a detached tank inclosing a float valve and provided with water-trap and vent-connections, whereby the device forms a new article of plumbers' ware which is complete in itself apart from the trap, and adapted for direct sale and ready attachment to any of the existing traps, as hereinafter fully set forth.

Figure 1:
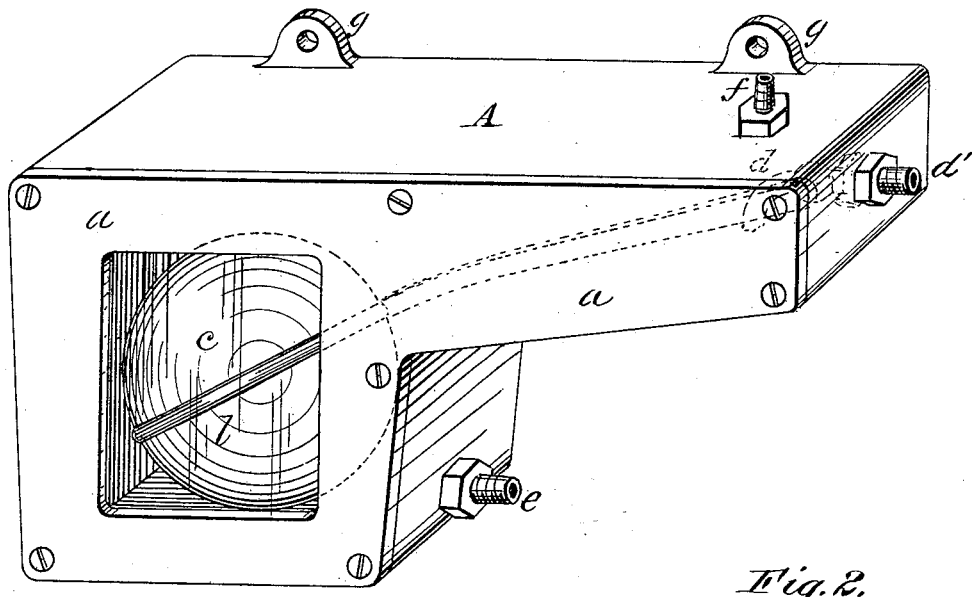
Figure 2:
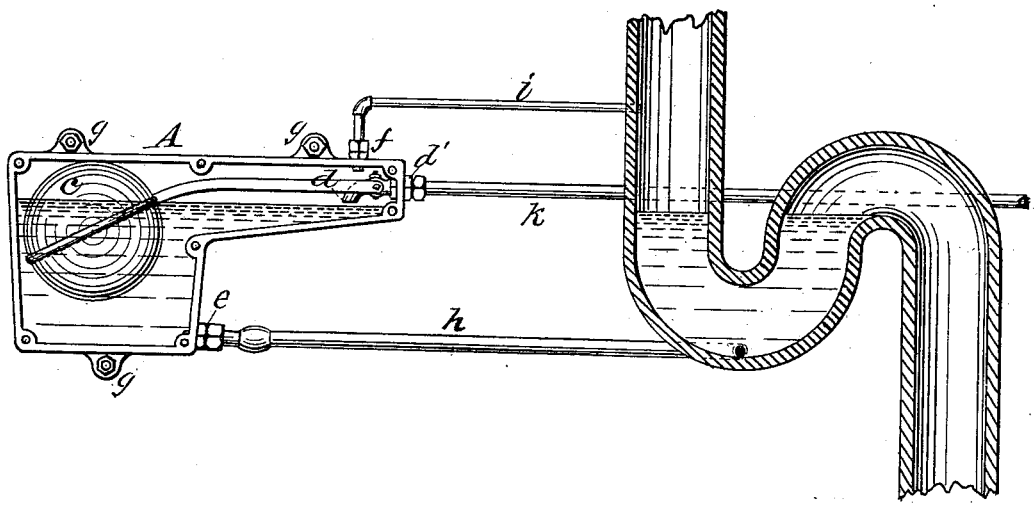

Figure 1 of the annexed drawings presents a perspective view of my new article of plumbers' ware just as it appears when complete, ready for sale to the plumber, and adapted for immediate connection with any trap. Fig. 2 is a sectional view, showing the manner of its connection with the trap.

In the drawings, A indicates the tank, which may be simply described as a box or chamber of any suitable shape. I prefer, however, the recumbent L shape shown, and I prefer to construct the box of cast-iron, open on the side, with a plate or cover, $a$, screwed over the open side after its contents are put in place, as seen in Fig. 1, so as to be completely water-tight, as will be understood. Within the tank is inclosed a ball-float, $c$, which is connected in the usual manner with the valve-plug of a ball-cock or float-valve, $d$, which is secured in the upper and narrow end of the tank, with its neck $d'$ projecting exteriorly for connection with the water-pipes, as seen in Figs. 1 and 2. From the bottom or water-chamber of the tank a nipple, $e$, projects, and from the top or air-chamber of the tank a similar or smaller nipple, $f$, projects, as shown in both figures. Now, the tank, as shown in Fig. 1, is completely inclosed on all sides, and is air and water tight at all points except at the three apertures or connecting-nipples $d'$ $e$ $f$, and in the condition here shown it is complete and ready for sale to and use by the plumber, and may be readily connected with the plumbing of any house, thus forming a new article of plumbers' ware.

The manner of connecting the tank with traps or plumbing of a house is shown clearly in Fig. 2—that is, the tank is first fastened to the walls, floor-beams, or other supports at any convenient place near the trap which it is desired to protect. The ears $g$ $g$, projecting from the tank, enable it to be thus readily screwed or fastened in position, as will be understood, and the tank is of course placed on a level with the trap; or, rather, the intended water-line of the tank should be on a level with the water-line of the trap, as illustrated. The nipple $e$ at the bottom of the tank may now be connected by a small lead tube, $h$, with the lower bend of the trap, while the upper nipple, $f$, is connected by similar or smaller tubing, $i$, with the house end of the trap above the water-line thereof, while the projecting neck $d'$ of the float-valve is connected by a small tube, $k$, with the water service-pipes, as fully illustrated in Fig. 2. These connections are of course all quite simple, and can be readily made in the ordinary manner by plumbers without removing the trap and with very little work, as will be understood.

It may now be understood by reference to Fig. 2 that when the connections are made, as shown and described, the pipe $h$ and nipple $e$ form a free connection between the bottom of the trap and the bottom of the tank, and hence the water will normally stand at a uniform level in both. If this level should be below the sealing-level of the trap, the fallen position or descent of the float $c$ in the tank will of course keep the float-valve $d$ open and admit water from the supply-pipe $k$ till the normal level is restored in both tank and trap, as illustrated in Fig. 2, when of course the water will cease to enter by the rise of the float and closing of the valve, thus maintaining a constant seal. If at any time the level falls in the trap by evaporation or other cause, or if the water in the trap becomes suddenly and completely removed by siphonage, it will be immediately restored from the tank by the action of the float and supply valve, as will be be readily understood, thereby forming a valuable correcting or safety device, which constantly guards the trap and maintains a full seal therein, thus keeping it in a good sanitary condition, and constantly preventing the inflow of sewer-gases under all conditions, whether the trap is in constant or occasional use, or even though the traps be out of use, as in the case of an unoccupied house.

I prefer to cement a glass pane, $l$, in one side of the tank, preferably in the removable side, as seen in Fig. 1, so that the workings of the tank may be readily observed, and a greater assurance of safety thus given to the householder.

The tank, as may be noted in Fig. 1, need not be large, as its capacity need not be much greater than the capacity of the sealing-bend of the trap. Hence the tank will be light and comparatively inexpensive, and will have the advantages of neatness and compactness, whereby it can be readily affixed almost anywhere near the traps without objection—for instance, under basins, sinks, &c., in the case of small traps, as well as in the cellar in the case of the main trap.

The advantage of the recumbent L-shaped tank shown is that space and material are economized thereby, and sufficient room is provided for the movement of the float and for the accumulation of the necessary charge of water in one and the same end of the tank.

The nipple $f$ and pipe $i$ form of course an air-vent between the tank and trap, whereby the rise and fall of water in the tank is freely allowed without resistance, which would of course not be the case with an inclosed tank unless some such vent device was provided. Instead, however, of carrying this vent-pipe $i$ to the house end of the trap, it might be carried to the ventilating-pipe, which commonly extends from the top or outer bend of the trap to the roof of the house; or, instead of arranging the vent-pipe as shown, it might be dispensed with and the nipple $f$ connected with an air-tight collapsible rubber bag of about the same capacity as the tank, which, when the tank was empty of water, would be collapsed, and into which the air would be transferred from the tank when the water rose therein, and vice versa; or, again, instead of either of the former, the float, when raised to its normal level, might be arranged to close the air-vent opening $f$ and again open the same as soon as it descends. The two latter devices, however, I do not at all recommend, although they are practicable; but I simply mention them to show that the precise vent-connection shown in Fig. 2, while entirely preferable, is not essential.

It may be further noted on reference to Fig. 2 that as the tank is formed and connected its interior is completely isolated from the interior of the house and communicates only with the interior of the waste pipes or traps. Hence, should the waste pipes or traps become at any time flooded by a stoppage at some point, the tank may also become simultaneously filled or flooded therefrom; but the water cannot escape from the tank into the apartments to cause any flood or damage therein, owing to the water-tight and inclosed construction of the tank and its connections, as will be readily understood. This feature of inclosure is, however, shown and claimed in my former patent, where it is distinguished from a previous device of this character, where an open tank with float-valve and water-supply was connected with the trap of a water-closet, which open tank, as will be readily seen, would be impracticable in case of a waste or sewer trap.

In the drawings I have shown the tank as provided with the simple and well-known form of float and float-valve; but instead of this the float-valve shown in my former patent may be used, or any other suitable form, if desired.

What I claim is—

1. The combination, with the trap, of an inclosed tank inclosing a float-valve and placed on a level with the sealing-bend of the trap, or nearly so, having the base of its water-chamber communicating with the sealing-bend of the trap, its float-valve connected with the water-supply, and a suitable air-vent opening from the top or air chamber of the tank, substantially as and for the purpose set forth.

2. A new article of plumbers' ware adapted for ready connection to traps, consisting of a detached and inclosed tank inclosing a float-valve, with the neck of the valve opening or projecting from the exterior of the tank, and with an aperture or nipple opening from the base or water-chamber of the tank, and a vent-aperture or air-vent nipple opening from the top of the tank, and the whole adapted to be connected with the plumbing of a house, substantially as and for the purpose herein set forth.

3. The combination, with a trap, of an inclosed tank, A, arranged on a level therewith and inclosing a float-valve, with a communicating pipe, $h$, extending from the base of the tank to the base of the trap, a water-supply pipe, $k$, connected with the float-valve, and an air-vent pipe, $i$, extending from the top of the tank to the top of the trap or its equivalent, substantially as and for the purpose set forth.

4. An inclosed tank formed in a recumbent L shape and inclosing a float-valve, with external connections adapted to connect with a trap, substantially as herein shown and described.

COLIN LIGHTBODY.

Witnesses:
CHAS. M. HIGGINS,
M. J. LEONARD.